US006595238B2

(12) United States Patent
De Matthaeis

(10) Patent No.: US 6,595,238 B2
(45) Date of Patent: Jul. 22, 2003

(54) INTERNAL COMBUSTION ENGINE HIGH-PRESSURE FUEL DELIVERY VALVE

(75) Inventor: Sisto Luigi De Matthaeis, Modugno (IT)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/919,174

(22) Filed: Jul. 30, 2001

(65) Prior Publication Data

US 2002/0036014 A1 Mar. 28, 2002

Related U.S. Application Data

(63) Continuation of application No. PCT/IT00/00489, filed on Nov. 29, 2000.

(30) Foreign Application Priority Data

Nov. 30, 1999 (IT) ....................................... TO990213 U

(51) Int. Cl.[7] ................................................ F16K 15/04
(52) U.S. Cl. ........................................ 137/539; 123/506
(58) Field of Search .............................. 137/539, 514.3, 137/493.3, 543.23; 123/467, 506

(56) References Cited

U.S. PATENT DOCUMENTS

| | | | | | |
|---|---|---|---|---|---|
| 1,143,328 | A | * | 6/1915 | Sprado | 123/506 |
| 2,761,462 | A | * | 9/1956 | Snyder | 137/539 |
| 2,804,825 | A | | 9/1957 | Mansfield | |
| 2,903,014 | A | | 9/1959 | Sheppard | |
| 3,514,223 | A | | 5/1970 | Hare | |
| 3,742,926 | A | | 7/1973 | Kemp | |
| 4,633,836 | A | * | 1/1987 | Faupel | 123/467 |
| 4,969,697 | A | * | 11/1990 | Lindenman | 303/113.5 |
| 5,161,572 | A | * | 11/1992 | Oberl et al. | 137/516.27 |
| 5,183,075 | A | | 2/1993 | Stein | |
| 5,251,664 | A | * | 10/1993 | Arvidsson et al. | 137/514 |
| 5,382,140 | A | * | 1/1995 | Eisenbacher et al. | 417/273 |
| 5,511,528 | A | * | 4/1996 | Iwanaga et al. | 123/467 |
| 5,669,356 | A | * | 9/1997 | Wall et al. | 123/467 |
| 6,345,609 | B1 | * | 2/2002 | Djordjevic | 417/273 |

FOREIGN PATENT DOCUMENTS

| | | |
|---|---|---|
| DE | 27 45 401 | 10/1977 |
| DE | 197 44 577 | 10/1997 |
| FR | 895628 | 11/1941 |
| FR | 902009 | 4/1958 |
| GB | 406383 | 9/1932 |
| GB | 832167 | 10/1957 |

OTHER PUBLICATIONS

Japanese Patent Abstract No. 61008467.

* cited by examiner

*Primary Examiner*—John Rivell
(74) *Attorney, Agent, or Firm*—Merchant & Gould, P.C.

(57) ABSTRACT

The valve (16) has a ball shutter (18) normally pushed by a helical compression spring (24) to close a delivery conduit (11) of the pump (5). A first end (28) of the spring (24) rests against a shoulder (26) of a fastening member (21) fitted in fluidtight manner to the pump (5); a second end (31) of the spring (24) acts directly on the ball (18); the fastening member (21) has a pin (33) coaxial with the conduit (11) and of such a length as to limit the travel of the ball (18) to a predetermined value; and the second end (31) of the spring (24) has at least one small-diameter turn (34) by which to engage the ball (18).

6 Claims, 1 Drawing Sheet

FIG.1
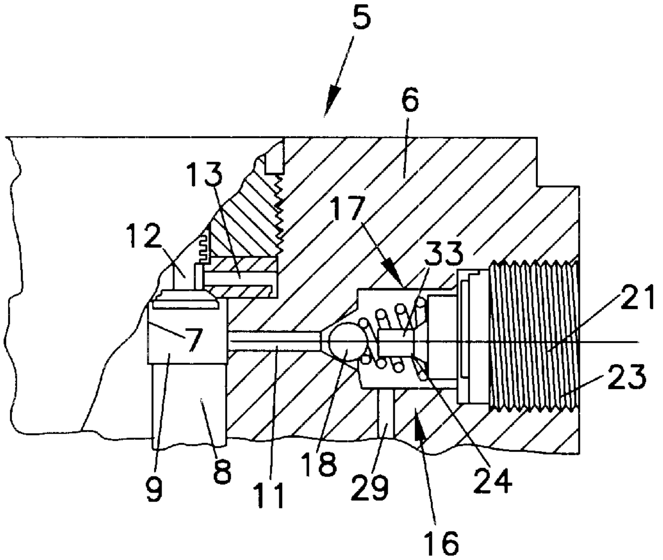
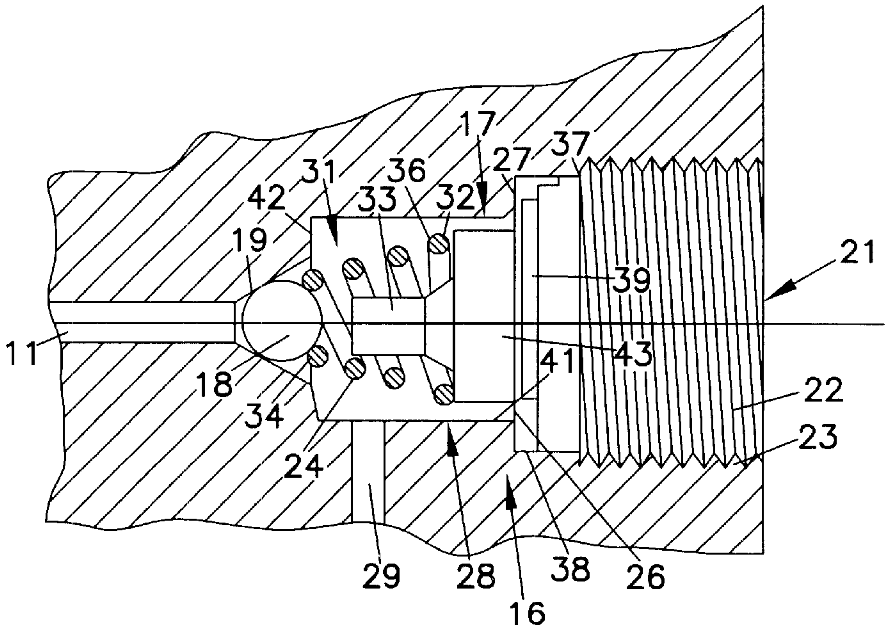
FIG. 2

INTERNAL COMBUSTION ENGINE HIGH-PRESSURE FUEL DELIVERY VALVE

This application is a continuation of international application number PCT/IT00/00489, filed Nov. 29, 2000, pending.

TECHNICAL FIELD

The present invention relates to a delivery valve of an internal combustion engine, e.g. diesel engine, high-pressure fuel pump

BACKGROUND ART

The high-pressure fuel pumps of modern diesel engines operate at high pressures of up to 1,600 bars, and the delivery valves must ensure constant delivery pressure with no fall in pressure or pressure peaks over and above the desired pressure.

Various types of delivery valves are known, each of which comprises a shutter pushed elastically to close a delivery conduit. In one known valve, the shutter is defined by a ball, which is pushed against its seat by a cylindrical helical spring having a first end resting on a fastening member on the pump. The other end of the spring acts on the ball by means of a cap, which slides axially inside a cylindrical hole on the pump and, together with the ball, defines the movable part of the valve.

The cap of the above known valve has a wall engaging the ball; a shoulder on which said first end of the spring rests; a cylindrical surface enclosing the turns of the spring; and axial cap guiding members in the hole and/or on the fastening member. The cap is therefore complicated and expensive to produce and makes the movable part of the valve relatively heavy, thus resulting in a certain amount of inertia in turn resulting in severe oscillations in the delivery pressure of the pump.

DISCLOSURE OF INVENTION

It is an object of the invention to provide a delivery valve of the above type, which is highly straightforward and cheap to produce, and has a lightweight movable part to eliminate the aforementioned drawbacks typically associated with known valves.

According to the present invention, there is provided a delivery valve of an internal combustion engine high-pressure fuel pump, comprising a shutter normally pushed by a helical compression spring to close a delivery conduit of the pump communicating with a compression chamber; said spring having a first end resting against a surface of a fastening member fitted in fluidtight manner to the pump; characterized in that a second end of said spring acts directly on said shutter; valid fastening member having a pin coaxial with said conduit and for guiding said spring; and said pin being of such a length as to limit the travel of said shutter to a predetermined value.

BRIEF DESCRIPTION OF DRAWINGS

A preferred, non-limiting embodiment of the invention will be described by way of example with reference to the accompanying drawings, in which:

FIG. 1 shows a partial section of an internal combustion engine high-pressure fuel pump comprising a delivery valve in accordance with the invention;

FIG. 2 shows a larger-scale section of the FIG. 1 valve.

BEST MODE FOR CARRYING OUT THE INVENTION

Number 5 in FIG. 1 indicates as a whole a diesel engine high-pressure fuel pump. Pump 5 comprises a pump body 6 having at least one cylinder 7, in which slides in known miner a piston 8 defining, in cylinder 7, a compression chamber 9 in which terminates a delivery conduit 11 communicating with a drain conduit 29.

Cylinder 7 has a known intake valve 12 by which the fuel to be compressed, from an intake conduit 13, is fed into cylinder 7. Pump 5 also comprises a delivery valve indicated as a whole by 16 and housed inside a hole 17 formed in pump body 6 and coaxial with delivery conduit 11 of cylinder 7.

Delivery valve 16 comprises a shutter defined by a ball 18 engaging a truncated-cone-shaped seat 19 (FIG. 2) at which delivery conduit 11 terminates towards hole 17. Delivery valve 16 also comprises a fastening member in the form of a cap 21 having a threaded portion 22 which screws onto a threaded portion 23 of hole 17.

Delivery valve 16 also comprises a helical compression spring 24 located between ball 18 and cap 21. Cap 21 has a first shoulder 26 located internally with respect to the threaded portion 22 of the cap 21, and contacting in fluidtight manner a shoulder 27 located inside the hole 17 with respect to its threaded portion 23; compression spring 24 has a first end 28 resting on a surface of cap 21; and hole 17 communicates with fuel drain conduit 29. It should be pointed out that the in-seat load produced by the pressure exerted by helical spring 24 on ball 18 is absolutely negligible with respect to the loads exerted on opposite sides of ball 18 by the in-service pressures in compression chamber 9 and drain conduit 29.

Cap 21 also has a pin 33 coaxial with hole 17 and therefore with delivery conduit 11. Pin 33 provides for guiding or transversely securing spring 24, and is of such a length as to limit the travel of ball 18 to a predetermined value when delivery valve 16 opens.

End 31 of spring 24 has at least one small-diameter turn 34 by which spring 24 engages ball 18 to prevent the ball from moving transversely. More specifically, spring 24 is truncated-cone-shaped, with the smallest-diameter turn being turn 34 resting on ball 18, and the largest-diameter turn 36 resting on shoulder 32.

Cap 21 comprises a cylindrical surface 37 adjacent to threaded portion 22 and facing shoulder 26, and which engages in fluidtight manner a corresponding cylindrical surface 38 of hole 17. Cap 21 also comprises a truncated-cone-shaped surface 39 located between cylindrical surface 37 and shoulder 26 to assist shoulder 26 in engaging shoulder 27 of hole 17.

Finally, hole 17 comprises a cylindrical portion 41 extending between shoulder 27 and an end wall 42 at which seat 19 terminates. Ample clearance exists between cylindrical portion 41 and the lateral surface of a cylindrical portion 43 of cap 21 extending between the two shoulders 26 and 32. Drain conduit 29 terminates at cylindrical portion 41 of hole 17.

When the fuel pressure in compression chamber 9 (and therefore in delivery conduit 11) is greater than the pressure in drain conduit 29, ball 18 moves towards pin 33 to open valve 16 so that fuel flows along drain conduit 29. When the fuel pressure in compression chamber 9 is once more lower than the pressure in drain conduit 29, spring 24 pushes ball 18 rapidly back into seat 19 to close delivery valve 16.

The advantages, as compared with known valves, of delivery valve 16 according to the invention will be clear from the foregoing description. Being defined solely by ball 18, the movable part of valve 16 is extremely lightweight, involves very little inertia, and ensures extremely rapid opening and closing of valve 16. Moreover, any oscillation in pressure within pump body 6 is eliminated, and the valve itself is much cheaper to produce by eliminating the usual cap interposed between ball 18 and spring 24.

Clearly, changes may be made to the delivery valve as described herein without, however, departing from the scope of the accompanying claims. For example, the shutter may be a plate type cooperating with a flat, as opposed to truncated-cone-shaped, seat.

Also, spring 24 may be cylindrical with a small-diameter end turn 34; pin 33 may also have a curved end surface for arresting ball 18 and keeping it aligned with the axis of seat 19; and the fastening member of the delivery valve may be formed differently and fixed in any known manner inside a seat in body 6.

Finally, delivery valve 16 may be fitted to the delivery conduit of a pump having radial pistons 8 engaging respective cylinders 7 arranged radially in pump body 6, and defining respective compression chambers 9.

In which case, hole 17 in body 6 may be located at a common delivery conduit communicating in known manner with all the compression chambers 9 via intermediate conduits.

What is claimed is:

1. A delivery valve of an internal combustion engine high-pressure fuel pump, comprising a delivery conduit communicating with a compression chamber of the pump, a shutter ball normally pushed by a helical compression spring to close a truncated-cone-shaped seat provided at an end of said conduit, a hole in said pump coaxial with said conduit and provided with a threaded portion, and a fastening member comprising a threaded portion screwing inside the treaded portion of said hole, wherein said fastening member is provided with a pin coaxial with said conduit for securing said spring, said pin being of such a length as to limit the travel of said ball to a predetermined value, said fastening member being also provided with a first shoulder adapted to be engaged by a first end of said helical spring, a second end of said spring comprises at least one small-diameter turn directly engaging said ball, said fastening member also having a cylindrical surface adjacent said first shoulder of said fastening member, said cylindrical surface, engaging in fluidtight manner, a corresponding cylindrical surface of said hole.

2. A valve as claimed in claim 1, wherein said fastening member has a truncated-cone-shaped surface located between said cylindrical surface of said fastening member and said first shoulder of said fastening member.

3. A valve as claimed in claim 1, wherein said spring is truncated-cone-shaped; said turn being the smallest-diameter turn.

4. A valve as claimed in claim 1, for a pump having radial pistons engaging respective cylinders in which the pistons define respective compression chambers; wherein said delivery conduit communicates with said compression chambers via intermediate conduits.

5. A delivery valve of an internal combustion engine high-pressure fuel pump, comprising a delivery conduit communicating with a compression chamber of the pump, a shutter ball normally pushed by a helical compression spring to close a truncated-cone-shaped seat provided at an end of said conduit, a hole in said pump coaxial with said conduit and provided with a threaded portion, and a fastening member comprising a threaded portion screwing inside the threaded portion of said hole, wherein said fastening member is provided with a pin coaxial with said conduit for securing said spring, said pin being of such a length as to limit travel of said ball to a predetermined value, said fastening member being also provided with a first shoulder, located internally with respect to the relevant threaded portion, contacting a shoulder of said hole in fluidtight manner, and with a second shoulder adapted to be engaged by a first end of said helical spring, a second end of said spring comprising at least one small-diameter turn directly engaging said ball.

6. A delivery valve of an internal combustion engine high-pressure fuel pump, comprising a delivery conduit communicating with a compression chamber of the pump, a shutter ball normally pushed by a helical compression spring to close a truncated-cone-shaped seat provided at an end of said conduit, a hole in said pump coaxial with said conduit and provided with a threaded portion, and a fastening member comprising a threaded portion screwing inside the threaded portion of said hole, wherein said fastening member is provided with a first shoulder contacting a shoulder of said hole in fluidtight manner, and with a second shoulder adapted to be engaged by a first end of said helical spring, a second end of said spring comprising at least on small-diameter turn directly engaging said ball, said fastening member also having a cylindrical surface adjacent said first shoulder of said fastening member, said cylindrical surface engaging, in fluidtight manner, a corresponding cylindrical surface of said hole.

* * * * *